(12) United States Patent
Sorniotti et al.

(10) Patent No.: US 7,945,044 B2
(45) Date of Patent: May 17, 2011

(54) METHOD AND SYSTEM FOR PERFORMING AN UNTRACEABLE SECRET MATCHING

(75) Inventors: Alessandro Sorniotti, Antibes (FR);
Frederic Montagut, Zurich (CH);
Annett Laube, Valbonne (FR); Refik Molva, Valbonne (FR); Konrad Wrona, Nice (FR); Laurent Gomez, Le Cannet (FR)

(73) Assignee: SAP AG, Walldorf (DE)

( * ) Notice: Subject to any disclaimer, the term of this patent is extended or adjusted under 35 U.S.C. 154(b) by 513 days.

(21) Appl. No.: 12/188,044

(22) Filed: Aug. 7, 2008

(65) Prior Publication Data
US 2009/0049517 A1 Feb. 19, 2009

(30) Foreign Application Priority Data

Aug. 8, 2007 (EP) .................................... 07290989

(51) Int. Cl.
*H04L 9/30* (2006.01)
*H04L 9/28* (2006.01)
*H04L 9/32* (2006.01)

(52) U.S. Cl. ............................. 380/28; 380/30; 713/168
(58) Field of Classification Search .................... 380/28, 380/30; 713/168
See application file for complete search history.

(56) References Cited

U.S. PATENT DOCUMENTS

| 2005/0071677 A1 | 3/2005 | Khanna et al. |
| 2005/0144440 A1 | 6/2005 | Catherman et al. |
| 2007/0101121 A1 | 5/2007 | Henry et al. |
| 2007/0118890 A1 | 5/2007 | Song |
| 2007/0136800 A1 | 6/2007 | Chan et al. |
| 2007/0165843 A1 | 7/2007 | Lauter et al. |

FOREIGN PATENT DOCUMENTS

EP 2023528 B1 9/2009

OTHER PUBLICATIONS

Decision to Grant for EP Application No. 07290989.8, mailed Sep. 3, 2009, 3 pages.
Communication under Rule 71(3) EPC for EP Application No. 07290989.8, mailed Apr. 14, 2009, 4 pages.
Response to Written Opinion for EP Application No. 07290989.8, filed Sep. 29, 2008, 12 pages.
Groot, Jogchem D., "Safeguarding Privacy in Trust Negotiation", (Mar. 2005), pp. 10.
Castelluccia, Claude et al., "Secret Handshakes from CA-Oblivious Encryption", ASIACRYPT 2004, LNCS 3329, (2004), pp. 293-307.

(Continued)

*Primary Examiner* — Philip J Chea
(74) *Attorney, Agent, or Firm* — Brake Hughes Bellermann LLP

(57) ABSTRACT

Performing an untraceable secret matching between a first credential associated with a first property of a first user and a second credential associated with a second property of a second user includes receiving the first credential, receiving a matching reference formed so the first user can detect a matching of the first property with a remote property from a credential of another user, supplying a first nonce value to the second user, receiving a hidden version of the second credential from the second user formed by the second user on the basis of the second credential, the first nonce value supplied by the first user and a random value locally generated on a side of the second user, and performing the matching by combining the first credential and the received hidden credential with the first nonce value and comparing the combination with the matching reference.

16 Claims, 2 Drawing Sheets

OTHER PUBLICATIONS

Balfanz, Dirk et al., "Secret Handshakes from Pairing-Based Key Agreements", Proceedings of the 2003 IEEE Symposium on Security and Privacy (SP'03), (2003), pp. 1-17.

Bussard, Laurent et al., "Establishing Trust with Privacy", Security Protocols 2004, LNCS 3957, (2006), pp. 199-209.

Bradshaw, Robert W., et al., "Concealing Complex Policies with Hidden Credentials", CCS'04, Washington, DC, USA, (Oct. 25-29, 2004), 12 pgs.

Holt, Jason E., et al., "Hidden Credentials", WPES'03, Washington, DC, USA, (Oct. 30, 2003), 8 pgs.

Ateniese, Giuseppe et al., "Secret Handshakes with Dynamic and Fuzzy Matching", NDSS' 07, (2007), pp. 1-19.

European Search Report for EP Patent Application No. 07290989.8, mailed May 9, 2008, pp. 8.

Frikken, Keith B., et al., "Trust Negotiation with Hidden Credentials, Hidden Policies, and Policy Cycles", (2006), pp. 15.

Boneh, Dan et al., "Identity-Based Encryption from the Weil Pairing", Advances in Cryptology—Proceedings of CRYPTO 2001—Section 5.1, (2001), 2 pgs.

Xu, S et al., "k-anonymous secret handshakes with reusable credentials", In ACM Conference on Computer and Communications Security, (2004), pp. 158-167.

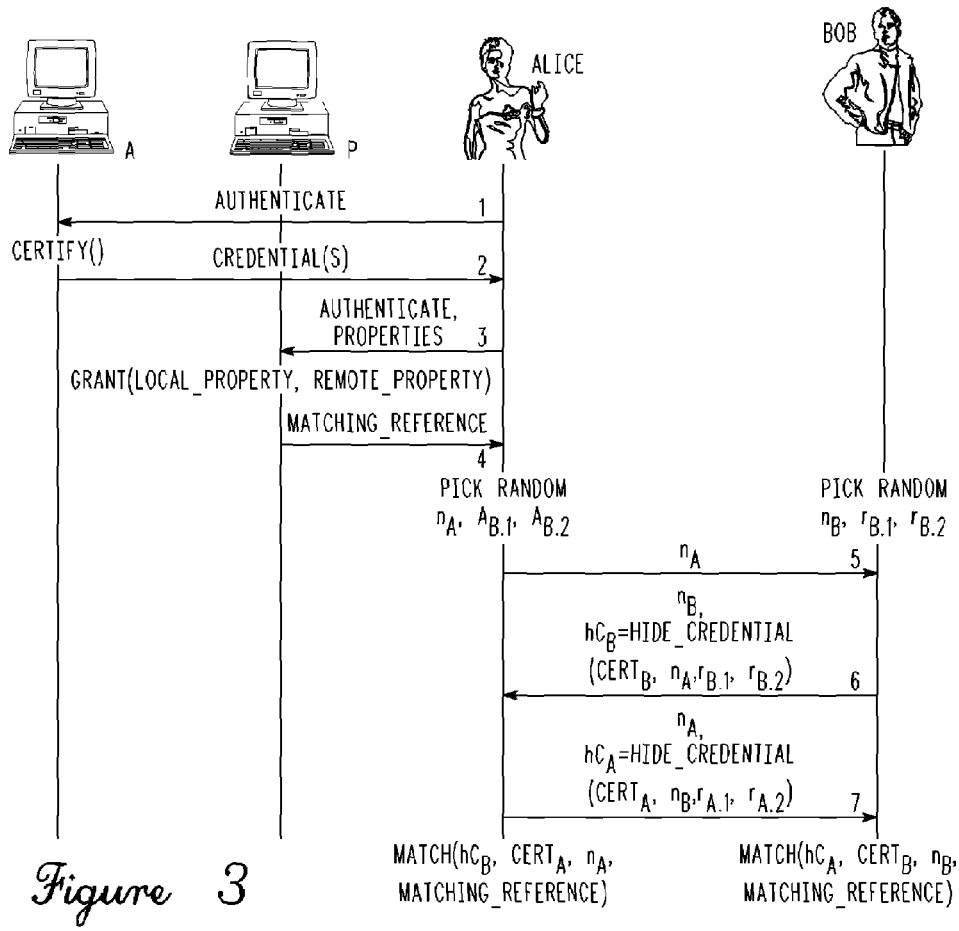
Figure 3
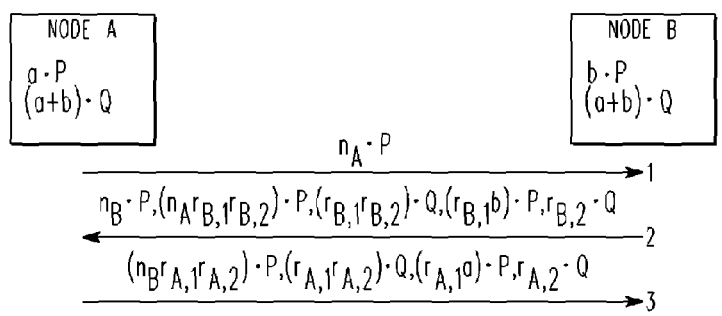
Figure 4A
Figure 4B

METHOD AND SYSTEM FOR PERFORMING AN UNTRACEABLE SECRET MATCHING

CROSS-REFERENCE TO RELATED APPLICATION

This application claims priority under 35 U.S.C. §119 to European Patent Application EP 07290989.8, filed Aug. 8, 2007, titled "METHOD AND SYSTEM FOR PERFORMING AN UNTRACEABLE SECRET MATCHING," which is incorporated herein by reference in its entirety.

TECHNICAL FIELD

The description refers generally to a mutual verification of matching credentials owned by separate entities.

BACKGROUND

In some circumstances, representations of credentials to be matched are exchanged in cleartext and compared with a cleartext repository of matches worth noticing. However, such a solution may not protect the confidentiality of the exchanged information. The complete information about the respective credentials of the peering entities may be disclosed although there is only an interest in matching combinations regardless of the particular nature or content of that combination. Encryption may provide a partial answer to this existing problem. Exchanging the credentials to be matched in an encrypted form, using a secure encryption scheme and pre-distributing an encrypted representation of each critical matching to each entity, may allow it to match a combination without knowing the real nature of the property. However, although this may solve the confidentiality issue, it still leaves another open problem. It allows, for example, an eavesdropper to trace entities with similar properties since the exchanged values are always the same. Some of the solutions in literature solve this issue by providing a sufficient number of pseudonyms and a trapdoor function to verify that these pseudonyms are in fact legitimate ones. The main drawback of these schemes may be that they depend on a central entity for the provision of multiple pseudonyms.

SUMMARY

Therefore, it would be desirable to have a scheme where separate entities owning credentials which are to be matched with the credentials of one or further other entities, can autonomously create multiple representations of their credentials and achieve perfect unlinkability. Furthermore, it would be desirable that both security goals, confidentiality of the exchanged characteristics and untraceability for external eavesdroppers could be accomplished.

This disclosure describes a mutual verification of matching credentials. Generally, it is possible that separate entities or users own credentials which are derived from group membership, from the possession of some properties or from the possibility to generate or detect particular events. In the following, all these characteristics, namely group membership, possession of properties or possibility to generate or detect particular events and all other possible constellations may be summarized under the term "property". When entities interact together, i.e., getting in the proximity, using a common resource and so forth, they perform a so-called handshake in order to mutually verify if some of the owned credentials match. The word "match" may be interpreted here as both a check for equality, i.e. two credentials are equal, both parties as the respective owners of those credentials belong, for instance, to the same group, or complementarity, i.e., to open a vault, two different keys are needed and one party which owns one of the credentials to be matched as one key can secretly check whether the other party owning the other credential has the complementary one and therefore allows to open the vault.

A method for performing an untraceable secret matching between at least two credentials of two users, respectively, within a network system is provided, wherein the matching is performed by hiding at least one of the two credentials which is to be sent through the network from one of the users to the respective other user, on the basis of the respective credential salted by a nonce and at least one random value, combining on side of the other user the at least one hidden credential with the other credential of the respective other user and comparing the combination with an appropriate matching reference.

According to one aspect, a method for performing an untraceable secret matching between at least a first credential associated with a first property of a first user and a second credential associated with a second property of a second user within a network system is provided. Thereby, the matching performed on side of the first user may include receiving via a secure channel the first credential from an authentication component upon verification that the first user possesses the first property, receiving via a secure channel a matching reference from a policy manager component upon verification that the first user is entitled to perform the matching, the matching reference being formed such that the first user can detect a matching of the first property with a remote property from a credential of another user during a handshake, supplying a first nonce value to the second user, receiving a hidden version of the second credential from the second user, the hidden credential being formed by the second user on the basis of the second credential, the first nonce value supplied by the first user and at least one random value locally generated on the side of the second user, and performing the matching by combining the first credential and the received hidden version of the second credential with the first nonce value and by comparing the combination with the matching reference.

Generally, the hidden credential may be formed using the credential to be hidden, a nonce value supplied by the other user and at least two random values locally generated on the side of the user who forms the hidden version of his credential.

In the following, definitions for some of the terms that will be used within the present disclosure are given.

A user is an entity which can be represented within the network system by a node and which is involved in performing a matching of credentials owned by different users.

A property is any important feature that a user possesses. A user wishes to reveal its property to other users and to verify properties of other users. However, a user wants to do so just with those users that are entitled to verify, giving no clue whatsoever about the nature of its property to any other user.

A credential is a description of a property. The credential, however, may be transmitted in an envelope or in form of a hidden version that prevents from its disclosure to non-authorized parties and also prevents to trace who transmits it.

A matching reference allows a user to combine two credentials, a local one, that means its own one, and a remote one owned by another, e.g. a second user and verify if those two credentials match.

There are different components involved in the proposed method, namely an authentication component, a policy manager component and the first and the second user.

The authentication component as used within the present disclosure represents an entity which is a trusted party that is able to certify membership, qualifications, properties of users and so forth which are a matter of certification. All different possibilities which can be a matter of certification are to be summarized in the following as properties. The authentication component can grant its users with respective credentials that will be later used by the respective user to derive material to perform a handshake.

The policy manager component is as the authentication component a trusted party. Its role consists in granting rights to perform the matching by giving to the respective user an appropriate matching reference. Generally, a user has more than one property so that the policy manager component gives that user a local repository of matching references, each matching reference being associated with one of the user's properties. It is stated that one and the same property of a user can be associated probably also with more than one matching reference. These matching references allow to verify if a handshake performed with another user is successful, that means that the credentials of the both users match according to one of granted matching rules. Those matching rules are pre-given and the policy manager component grants the right to perform a matching on basis of these pre-given matching rules.

A user is, as already mentioned, an entity which is involved in the execution of the described matching procedure. A user has normally a set of credentials corresponding to a set of properties and a set of matching references which the user can use to verify different matchings of its properties with properties of another user.

According to a further aspect, the method also may include issuing as output true if the matching is verified, false otherwise.

According to still another aspect, the first user may receive a plurality of matching references from the policy manager component, each matching reference being associated with a property of the first user and formed such that the first user can detect a matching of that respected property with a remote property from a credential of another user during a handshake. That means that a user can receive a plurality of matching references, each matching reference being associated with one of the user's properties. It is stated that one and the same property of a user can be associated with different matching references which can be used to detect a matching of these respective properties with different remote properties from credentials of further users during a respective handshake. The matching references can be maintained in an appropriate repository of the respective user.

According to still a further aspect of the proposed method a plurality of matching references is thus stored within a repository.

According to still a further aspect of the proposed method, the method may further include receiving a second nonce value from the second user, forming a hidden version of the first credential on the basis of the first credential, the second nonce value supplied by the second user and at least one random value locally generated on the side of the first user, and supplying the hidden version of the first credential to the second user.

Thus, both users, namely the first user and the second user have now the possibility to perform the matching between the first credential of the first user and the second credential of the second user by combining their own credential and the received hidden version of the credential of the other user with the respective nonce supplied by the other user and by comparing the combination with a respective matching reference. Both users, namely the first and the second user are equally treated.

Generally, the matching may be described in a very schematic manner. The first user possesses a first credential and the second user possesses a second credential, both credentials being represented in form of puzzle pieces which were given to them, respectively, by the authentication component. When one of the two users performs the matching process the respective user combines the two credentials together. The combined credentials are then compared against a matching reference which can be represented as a frame surrounding the puzzle pieces in case that the puzzle pieces match. As already mentioned, the matching reference is supplied by the policy manager component. If the comparison is successful, i.e. the frame representing the matching reference fits the combined first and second credentials, the matching process is verified and the respective user who has performed the matching can return a positive answer that the credentials match. Otherwise, the respective user will return an answer that the credentials do not match.

According to another aspect, a system is proposed which is configured to perform an untraceable secret matching between at least a first credential associated with a first property of a first user and a second credential associated with a second property of a second user within a network system. The system may include an authentication component configured to verify and certify the first and the second property of the first and the second user, respectively, and to grant the first and the second user with a first and a second credential, respectively, a policy manager component configured to verify at least that according to given policy rules the first user is entitled to perform the matching, and to issue and transmit an appropriate matching reference to the first user, the matching reference being formed such that the first user can detect a matching of the first property with a remote property from a credential of another user during a handshake, wherein the first user is configured to supply a first nonce value to the second user, to receive a hidden version of the second credential from the second user, the hidden credential being formed by the second user on the basis of the second credential, the nonce value supplied by the first user and at least one random value locally generated on the side of the second user, and to perform the matching by combining the first credential and the received hidden version of the second credential with the first nonce value and by comparing the combination with the matching reference.

According to a further aspect the first user is further configured to form a hidden version of the first credential, the hidden credential being formed on the basis of the first credential, a second nonce value supplied by the second user and at least one random values which is locally generated on the side of the first user, and to supply the hidden version of the first credential to the second user. Thus, the second user can also perform the matching by means of its own second credential, the nonce value supplied by the first user and the hidden version of the first credential also supplied by the first user. It is also possible that the system comprises both, the first and the second user.

Generally, the hidden credential may be formed using the credential to be hidden, a nonce value supplied by the other user and at least two random values locally generated on the side of the user who forms the hidden version of his credential.

There may be no difference whatsoever in the hidden representations created by the first user and the second user. Each party performs the same computation locally and sends the result to the other party.

It is also possible that the first user is further configured to issue as output true if the matching is verified and false otherwise.

According to another aspect of the system, the first and the second credentials are to be formed according to the following formula:

$$\text{Credential}(d) = F(K, d)$$

wherein d is a description of the respective property, F is a pseudorandom bit permutation and K is a random value in a key space of F.

It is possible that the hidden version of the first credential is to be formed according to the following formula:

$$\{(n_B r_{A,1} r_{A,2}) \cdot P, (r_{A,1} r_{A,2}) \cdot Q(r_{A,1} a) \cdot P, r_{A,2} \cdot Q\}$$

wherein $n_B$ is a nonce value supplied by the second user, $r_{A,1}$ and $r_{A,2}$ are two locally generated random values, generated by the first user A and a·P represents the credential of user A.

According to a further aspect the matching is to be performed by verifying the following equation:

$$(\hat{e}((r_{A,1}a) \cdot P, r_{A,2} \cdot Q) \times \hat{e}(b \cdot P, (r_{A,1} r_{A,2}) \cdot Q))^{n_B} \stackrel{?}{=} \hat{e}((n_B r_{A,1} r_{A,2}) \cdot P, (a+b) \cdot Q)$$

wherein ê is a computable, non-degenerate bilinear map, $r_{A,1}$, $r_{A,2}$ are two random values generated by the first user, b represents the second property, a represents the first property, P, Q are two random generators, $n_B$ is a nonce value locally generated by the second user.

According to another aspect of the proposed system it is possible that the authentication component and the policy manager component are configured to communicate at least with the first user via a secure channel, respectively. It is possible, that both components are generally communicating with users via such a secure channel. This may ensure mutual authentication, integrity and confidentiality.

A computer program product is also provided which comprises a computer-readable medium and a computer program stored on the computer-readable medium with program coding means which are suitable for carrying out the proposed method when the computer program is run on a computer.

Furthermore, a computer-readable medium is provided which comprises a computer program stored thereon, the computer program comprising program coding means which are suitable for carrying out the proposed method when the computer program is run on a computer.

Further features and implementations will become apparent from the description and the accompanying drawings.

It will be understood that the features mentioned above and those described hereinafter can be used not only in the combination specified but also in other combinations or on their own without departing from the scope of the present disclosure.

Various implementations are schematically illustrated in the drawings by means of an embodiment by way of example and are hereinafter explained in detail with reference to the drawings. It is to be understood, that the description is in no way limiting on the scope of the present disclosure and is merely an illustration of a preferred embodiment.

BRIEF DESCRIPTION OF THE DRAWINGS

FIG. 3 describes a schematic sequence diagram of a possible implementation of the proposed method.

FIG. 4 shows a schematic diagram of a handshake performed between a first user and a second user as it can be realized by an implementation of the proposed method.

DETAILED DESCRIPTION

Figure 1:
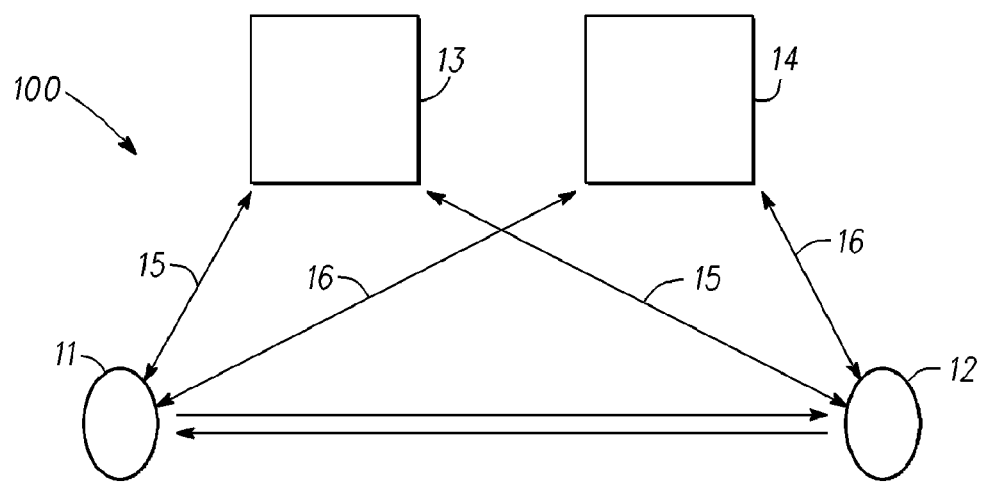
FIG. 1 shows a schematic structure of a system as it can be realized by a possible implementation of the proposed system.

In the following, a scenario is given in which the proposed method can be used. It is assumed that the first user is represented by Alice who works for the CIA. When Alice joins the CIA, she receives from CIA's authentication component at least one or more credentials that certify her affiliation to the CIA. Using those credentials, Alice can authenticate herself as a legitimate employee to any of the CIA assets. In case that she is just a desk employee, she does not need to perform a matching process, hence the policy manager component of the CIA will not grant her any right to perform a matching. On the contrary, if Alice is an agent involved in field missions, she might need to perform a secret handshake to verify, for instance, if she is dealing with a fellow CIA agent or an enemy trying to spoof his identity. In this case, Alice will be granted rights to verify whether the credentials of another entity performing a handshake match their own credentials, for instance, if they both belong to the CIA. In that case, the policy manager component of the CIA system will grant her appropriate rights to perform appropriate matchings.

When two possible agents of the CIA meet they run a handshake protocol. Alice can just verify if she is dealing with another CIA employee. If not she cannot assess anything about whom she is dealing with and the same applies for the other party. An eavesdropper listening to any two handshakes performed by Alice cannot link them as being made either by a CIA employee or by the same party twice. In addition, the other party can verify if Alice is a member of the CIA if and only if the CIA policy manager component granted him the right to perform the matching.

The proposed method comprises, as described before, several operations which are all described from the point of view of the first user. The first operation of receiving the first credential from the authentication component implies that the authentication component certifies the first property of the first user and grants upon certification of the first property of the first user the first user with the first credential that the first user can later use to perform a handshake. Before certification of the first property, the authentication component verifies that the first user indeed possesses the first property he later wants to be able to claim to have during a handshake phase, i.e. a group membership. Afterwards, upon verification, the authentication component issues the appropriate first credential and transmits the first credential to the first user. Generally, the transmission of credentials may be done using a secure channel that ensures mutual authentication, integrity and confidentiality.

The further operation of receiving a matching reference from a policy manager component further implies that the policy manager component firstly verifies that according to pre-given policies or matching rules the first user is entitled to perform the matching. Then, the policy manager component issues an appropriate matching reference such that the first user will be able to detect the presence of a remote property from a credential supplied by another user and match it with its own property via the first credential during a handshake. As stated for the transmission of the credentials by the authentication component, transmission of the matching reference also may be done on a channel that ensures mutual authentication, integrity and confidentiality.

The further step of receiving a hidden version of the second credential from the second user implies that the second user is configured to form a hidden version of the second credential during a handshake with the first user. Therefore, the second user takes as inputs its own credential, in the present case the second credential that the second user wants to supply to the first user performing the handshake, a first nonce value supplied by the first user and at least one random value locally generated on the side of the second user. Then, the second user outputs a hidden version of the second credential i.e. the second credential is protected by an envelope, ready to be sent to the first user. This hidden version provides privacy with respect to both third parties listening to the information exchange and those who want to intervene.

The further operation of performing the matching implicates that the matching is executed by the first user during a handshake. In performing the matching, the first user takes as inputs two credentials, a local one granted to the first user by the authentication component and a remote one sent in the hidden version by the second user involved in the handshake. Then, the first user combines the two credentials with the locally generated first nonce value and compares the result with the first matching reference. If a match can be verified, the first user can return an answer as true, otherwise as false.

In the following, a concrete scheme will be presented to perform a secret matching by using the proposed method. To implement the proposed schema, a computable, non-degenerate bilinear map $\hat{e}: G_1 \times G_1 \rightarrow G_2$ will be used as a mathematical primitive. The considered map will be chosen so that the computational Diffie-Hellmann (CDH) problem is assumed to be hard. Modified Weil or Tate pairings on supersingular elliptic curves are examples of such maps. As a precondition of the present concrete scheme to perform a secret matching using the proposed method, a trusted third party generates a prime q, two groups $G_1$ and $G_2$ of order q and an admissible bilinear map $\hat{e}: G_1 \times G_1 \rightarrow G_2$. The trusted third party also chooses two random generators $P, Q \in G_1$. Therefore, the parameters to be used in that concrete scheme to perform a secret matching using the proposed method are $\{q, G_1, G_2, \hat{e}, P, Q, H\}$ and these parameters are made public. Besides a bilinear map, a pseudorandom bit permutation $f: K \times \{0, 1\}^* \rightarrow Z_q$ taking arbitrary strings as input will be used. Finally, a random secret key K is to be used with the aforementioned pseudorandom bit permutation which is drawn from a key space. The latter is kept secret.

In the following, the method operations are again described by using the concrete parameters proposed in the concrete scheme to perform a secret matching using the proposed method.

As already described before, the operation of receiving the first credential from the authentication component implies that the authentication component first certifies the first property which means that the authentication component verifies that the first user indeed possesses the first property, that the first user later wants to be able to claim to have during a handshake phase. After the verification, the authentication component generates a value a=f(K, description of the first property). Using this functional value, it is impossible for anyone to compute the value a. The authentication component then sends to the first user the first credential which is formed in the concrete scheme by credential=a·P via a secure channel that ensures mutual authentication, integrity and confidentiality.

The mathematical concept used and explained above is based on the following:

The group $G_1$ is an additive subgroup of order q (where q is a big prime number) of the points on an elliptic curve, whose coordinates belong to a field Zp, where p is a big prime number satisfying some additional properties.

The bilinear map $\hat{e}$ is formed, based on the already mentioned Weil pairings, to operate from $G_1 \times G_1$ to $G_2$, which is a multiplicative group of order q.

All the elements which are used here are elements of $G_1$, points on the curve, on which just the sum can be performed, since it is an additive group. P and Q are two points of order q belonging to such group. Operations such as the following can be performed: given P and an integer n belonging to Zq, another point P'=nP can be obtained. Finding n given P and P' is believed to be computationally infeasible.

Given two points P and Q in G1, and other two points P'=aP and Q'=bQ, it's infeasible to tell if a=b.

The further operation of receiving from the policy manager component a matching reference implies that the policy manager component first of all verifies that the first user, according to the pre-given policies, is really entitled to perform the matching. In the concrete scheme described here, it is assumed that the policy manager component knows the descriptions of the first property of the first user and the second property of the second user, respectively. Those descriptions are described in the following by $d_1$ and $d_2$, respectively. Given the two properties in the form $d_1$ and $d_2$, the policy manager component first of all calculates the two values a=f(K, $d_1$) and b=f(K, $d_2$). Then, the policy manager component issues the matching reference as matching_reference=(a+b)·Q which the policy manager component sends to the first user on a channel that ensures mutual authentication, integrity and confidentiality.

The further operation of the proposed method, namely receiving a hidden version of the second credential from the second user implies that the second user is able to form a hidden version of its own, namely the second credential. The forming of such a hidden version is normally executed by the respective user during a handshake. The second user takes as inputs the second credential that the second user wants to supply to the first user in the form credential=b·P, a first nonce value $n_A$ supplied by the first user and two random values $r_{B,1}$ and $r_{B,2}$ which are locally generated on the side of the second user. The hidden version by the second user involved in the handshake is then transmitted to the first user which receives the hidden version in the form:

$$\{(n_A r_{B,1} r_{B,2}) \cdot P, (r_{B,1} r_{B,2}) \cdot Q (r_{B,1} b) \cdot P, r_{B,2} \cdot Q\}.$$

The proposed scheme using two random values $r_{B,1}$ and $r_{B,2}$ distributed on three points protects from any tracing, since the above mentioned Weil pairings are just bilinear, meaning they can take two points ($G_1 \times G_1 \rightarrow G_2$), but the creation of a trilinear pairing ($G_1 \times G_1 \times G_1 \rightarrow G_2$), which would accomplish the tracing using the three points, is believed hard. The reference problem is called Bilinear Diffie-Hellman assumption.

The operation of performing the matching is executed by the first user during the handshake. The matching procedure takes as inputs the first and the second credentials, the first credential granted to the first user by the authentication component in the form credential=a·P, and the second credential supplied by the second user in the previously described hidden version in the form $\{(n_A r_{B,1} r_{B,2}) \cdot P, (r_{B,1} r_{B,2}) \cdot Q (r_{B,1} b) \cdot P, r_{B,2} \cdot Q\}$, where $r_{B,1}$ and $r_{B,2}$ are, as already described, two random values generated by the second user during its invocation of hiding its credential, $n_A$ is a nonce value generated by the first server and the second server's credential in its unhidden form is credential=b·P. Then, the first user combines the first and the second credentials with the nonce value $n_A$ generated by the first user and compares the result with the matching reference matching_reference=(a+b)·Q. The matching, on the first user's side, is performed using the following equivalence:

$$(\hat{e}((r_{B,1}b) \cdot P, r_{B,2} \cdot Q) \times \hat{e}(a \cdot P, (r_{B,1} r_{B,2}) \cdot Q))^{n_A} \stackrel{?}{=} \hat{e}((n_A r_{B,1} r_{B,2}) \cdot P, (a+b) \cdot Q)$$

This equivalence can be derived from valid definitions in the field of the already mentioned Weil pairings.

The Weil parings by definition satisfy the following:

$$\hat{e}(a \cdot P, b \cdot Q) = \hat{e}(P, Q)^{ab}$$

Considering the left hand side of the equivalence, this can be expressed as follows:

$$(\hat{e}((r_{B,1}b) \cdot P, r_{B,2} \cdot Q) \times \hat{e}(a \cdot P, (r_{B,1} r_{B,2}) \cdot Q))^{n_A} = (\hat{e}(P,Q)^{r_{B,1} r_{B,2} b} \times \hat{e}(P,Q)^{r_{B,1} r_{B,2} a})^{n_A} = (\hat{e}(P,Q)^{r_{B,1} r_{B,2}(a+b)})^{n_A} = \hat{e}(P,Q)^{r_{B,1} r_{B,2} n_A (a+b)}$$

Considering the right hand side of the equivalence, this can be expressed as follows:

$$\hat{e}((n_A r_{B,1} r_{B,2}) \cdot P, (a+b) \cdot Q) = \hat{e}(P,Q)^{n_A r_{B,1} r_{B,2}(a+b)}$$

Taking both expressions together, the equivalence may be verified.

The first server returns true if the above mentioned equivalence is verified and false otherwise.

It is to be stated that, generally, two random values are used to salt the above mentioned credential. Thus, it can be guaranteed to achieve untraceability, as explained before.

By means of the proposed method, privacy with respect to third parties which are not directly involved in the handshake between the first and the second user can be guaranteed. A third party who monitors the information exchanges between the first and the second users as legitimate peers cannot retrieve any information about the credentials and the identity of the communicating parties during the information exchange and over several exchanges. Therefore, anonymity and unlinkability may be guaranteed.

Furthermore, privacy also may be guaranteed with respect to so-called protocol players. Each party, namely the first user and the second user, respectively, is only authorized to check whether another party, namely the first and the second user, respectively, holds credentials that match its own credentials based on pre-given matching rules. Those matching rules can include equivalence of the credentials to be compared or complementarity of the respective credentials.

Moreover, authorization also may be guaranteed. In order to be able to perform a secret verification, each party, namely the first and the second user, respectively, must be authorized by granting of an appropriate credential and an appropriate matching reference by the already mentioned trusted third parties, namely the described authentication component and the policy manager component, respectively.

Furthermore, security of credential representation also may be guaranteed. Only parties, namely the first and the second user, holding valid credentials can run a successful mutual verification. There is no danger of replay, forgery, reverse computation, etc.

There are a lot of possible use cases for the proposed method. Generally, it can be distinguished between two main possible applications of the proposed method, namely an equality matching and a complementarity matching.

An equality matching allows to secretly verify whether two entities as for example as previously called the first and the second user, possess both a property, i.e. belong to a same group. A possible use case for this scenario has already been mentioned by the before mentioned CIA scenario. In the following, another scenario will be described. It is assumed that a patient, named John, is affected by some chronic disease for which he needs constant monitoring of health conditions. The monitoring is performed using a body sensor network (BSN), made of a set of sensors that are continuously monitoring parameters such as blood pressure, temperature and so forth. The BSN periodically needs to transfer the information related to John's health to the fixed network of healthcare practitioners, where any alert can be detected on time and countermeasures can be taken. Hence, the BSN must periodically connect to some trusted gateway (TG) where all information can be dumped. TGs are installed in a number of public places and the connection between the BSN and the trusted gateway is established using a wireless link. When connecting to a TG, the BSN of a patient needs to be sure to be dealing with a TG and not a spoofed node whose aim is to collect private information. On the other hand, TGs accept data just from legitimate BSNs. Hence, equality matching can be used in a BSN/TG handshake to verify that both nodes belong to one and the same healthcare network, assessing whether they own a credential that certifies the membership to this respective healthcare network. Once this initial trust is established, standard security protocols can be used to perform an information exchange. This use case can be generalized to a mutual authentication between wireless sensor network (WSN) nodes and WSN gateways in a generic WSN system.

A complementarity matching is another type of operation allowed by the proposed method. Complementarity matching can be interpreted in two ways. On the one hand this could be a collaborative one, whose purpose is to match pairs of entities, namely users that hold complementary properties whose simultaneous presence allows for particular operations that weren't allowed to the separate entities singularly (e.g. the aforementioned vault scenario). A second approach for complementarity matching is a detection of conflicts. This will be explained in the following with an example use-case.

It is assumed that barrels with chemical elements are shipped on good trains. Good trains can host barrels belonging to different companies. Checks should be made in order to prevent stock barrels containing elements that could react together close to each other. Still, these checks should be carried out in a way that the privacy of the content of the barrels are preserved with respect to the other companies and to external eavesdroppers.

Using the proposed method the scenario can be the following. Each stock of barrels containing the same element is equipped with a wireless node. This node is equipped with a credential certifying its content, released by some trusted entity. In addition, this node receives an appropriate matching reference to verify the matching with some barrel holding conflicting chemical elements. Whenever some stock of barrels is added to the train, it performs the handshake with other nodes to verify whether there are some matches. If so, the node can raise an alarm which can be treated immediately by the personal of the train. This way, however, it can only assess that there is a matching without knowing exactly the content of the other barrels. If no matching is verified, the node has no clue on the content of the sibling stock of nodes.

The method proposed in the present disclosure achieves untraceability thanks to the operation of hiding the credentials on the basis of the respective credential salted by a nonce and at least one random value. Therefore, there is no need for an authentication component to produce pseudonyms since the users can produce pseudonyms as results of the hiding operation autonomously, needless of third parties. The fact, that each user can generate pseudonyms autonomously upon need also reduces the needed storage requirements. Furthermore, the proposed method of this disclosure does not rely on hash functions to perform a handshake.

It can also be stated that by using the proposed method unlinkability can be achieved.

FIG. 1 shows a schematic structure of a system 100 as it can be realized by a possible implementation of the proposed system. The system 100 is configured to perform an untraceable secret matching between at least a first credential associated with a first property of a first user 11 and a second credential associated with a second property of a second user 12 within a network system. The system 100 comprises an authentication component 13 and a policy manager component 14. The authentication component 13 is configured to verify and certify the first and the second property of the first user 11 and the second user 12, respectively. Furthermore the authentication component 13 is configured to grant the first user 11 and the second user 12 with a first and a second credential, respectively. The authentication component 13 communicates with the first user 11 and the second user 12, respectively, using a secure communication channel 15 that ensures mutual authentication, integrity and confidentiality.

The policy manager component 14 is configured to verify at least that according to given policy rules the first user 11 is entitled to perform the matching, and to issue and transmit an appropriate matching reference to the first user 11. The matching reference is formed such that the first user 11 can detect a matching of the first property with a remote property from a credential of the second user 12 during a handshake between the first user 11 and the second user 12. The policy manager component 14 communicates with the first user 11 and the second user 12, respectively, using a secure communication channel 16 that ensures mutual authentication, integrity and confidentiality.

Furthermore, the first user 11 is configured to supply a first nonce value to the second user 12. The first user 11 can also receive a hidden version of the second credential from the second user 12. The hidden credential is formed by the second user 12 on the basis of the second credential, the nonce value supplied by the first user 11 and at least one random value locally generated on the side of the second user 12. The first user 11 can perform the matching by combining the first credential and the received hidden version of the second credential with the first nonce value and by comparing the combination with the matching reference.

It is possible that both users are provided with the same capabilities, which means that the above made explanation with respect to the first user 11 can also be applied to the second user 12 correspondingly.

Figure 2:
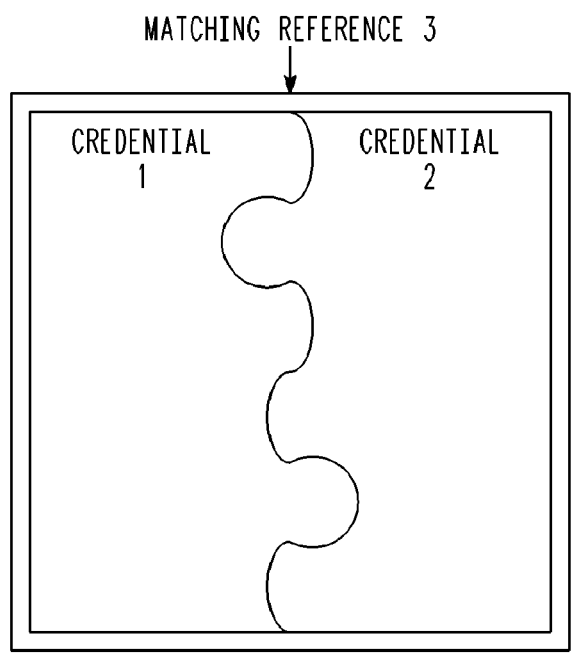
FIG. 2 shows an intuitive representation of credentials and a matching reference as it can be represented and used in an implementation of the described method.

FIG. 2 shows an intuitive representation of a matching process as it can be performed by using the proposed method. A first user possesses a first credential 1 and a second user possesses a second credential 2, both credentials are represented in form of puzzle pieces. The first credential 1 was given to the first user by an authentication component upon verification that the first user really possesses a property which is associated with the first credential 1. The second user also gets the second credential 2 by the authentication component upon verification that the second user really possesses a property which is associated with the respective second credential 2. When at least one of the users, namely the first or the second user perform a matching process, the respective user combines the two credentials, namely the first credential 1 and the second credential 2. The combined credentials are then compared against a matching reference which is represented in FIG. 2 as a frame 3. The matching reference 3 is supplied by a policy manager component. If the comparison is successful, i.e. the frame 3 fits the combined credentials 1 and 2, the matching process will return a positive answer that the credentials 1 and 2 match. Otherwise, a negative answer can be returned.

FIG. 3 shows a sequence diagram sketching operations performed when using an implementation of the proposed method. A first user is shown, called here Alice. A second user is shown here, called Bob. Furthermore, an authentication component A and a policy manager component P are shown. The following scenario is described from the point of view of the first user, namely Alice. It is assumed that Alice has specific assurances about her identity, membership, characteristics, roles or, more in general, about properties. Therefore, Alice sends or communicates to the authentication component A, as indicated by arrow 1, all the needed properties. After a successful authentication Alice will receive one or more required credentials associated with her respective properties, as indicated by arrow 2. After that, Alice will also contact, as indicated by arrow 3, the policy manager component P and after a successful authentication receive, as indicated by arrow 4, one or more matching references that will allow Alice to actually carry out a matching process between one or more of her own credentials and one or more credentials of a further user. The policy manager component P will therefore transmit one or more matching references as indicated by arrow 4 back to Alice which receives those matching references and which can store those matching references within an appropriate repository.

Alternatively, Alice can also call the policy manager component P every time when she wants to perform a matching between one of her properties and a specific property of another user. During every handshake with other users, Alice starts by picking three random numbers. The first one, nA is a first nonce value that Alice will supply to a second user the credential of whom should be matched with her own credential. Alice sends this first nonce value nA right away to the second user Bob in order to protect against replay attacks, as indicated by arrow 5. The other two random numbers rA,1 rA,2 are random values that Alice will use to obscure or hide her credentials before sending the credentials to the second user Bob. As soon as Alice herself has received the corresponding second nonce nB from the second user, namely Bob (arrow 6), she can use this second nonce nB to create a hidden version of her credential in order to send this hidden version back to the second user, namely Bob, which is indicated by arrow 7. In turn, Bob does the same and sends to Alice a hidden version of his credential as indicated by arrow 6. Alice finally can perform a matching process in order to check if a matching between her credential and the hidden version of Bob's credential is satisfied. This is done using the matching reference supplied by the policy manager component P. Thereby, a matching function or a matching rule is appropriately supplied to the hidden version of Bob's credential, Alice's credential, the first nonce value nA and the corresponding matching reference. This matching function can, for example, correspond to an equivalence. The corresponding matching procedure using the hidden version of the first credential of Alice, Bob's credential as the second credential, the second nonce value nB and a corresponding matching reference supplied from the policy manager component to Bob and associated with Bob's credential can be performed on Bob's side.

FIG. 4a shows a further sketch of a possible handshake. The two users A and B possess their credentials in form of (a·P) and (b·P), respectively, and the matching reference, namely ((a+b)·Q) that allows them to verify whether the two credentials match. In the case shown here and as indicated by arrow 1, the handshake is initiated by user A who sends its nonce value in form of $n_A$·P to the second user B. B in turn responds, as indicated by arrow 2, with its nonce value $n_B$·P and a hidden version of its second credential (b·P) which is formed according to a specific functional rule, namely in the case shown here by $(n_A r_{B,1} r_{B,2})·P, (r_{B,1} r_{B,2})·Q, (r_{B,1} b)·P, r_{B,2}·Q$ wherein $n_A$ corresponds to the first nonce value generated by the first user, $r_{B,1}$ and $r_{B,2}$ are random numbers generated on the side of the second user, and P and Q are random operators chosen from a group of operators. In a third message, the first user A does the same and sends its own result of the hidden procedure, namely a hidden version of his credential (a·P), namely the first credential to the second user B. Finally, the first user A is able to apply a specific equivalence to verify the matching between the first and the second credential. The equation to be verified for this matching is shown in FIG. 4b.

The message exchange shown in FIG. 4a shows how to use the proposed method to perform a matching of complementarity, i.e. user A has property a, user B has property b and it is looked for the simultaneous presence of a AND b, but it has to be stated that the method can also be used to match equivalence of credentials by setting the matching reference to (2a)·Q.

The following is a proof-of-concept of the underlying protocol:

//Security parameter such the discrete log assumption holds int param=160;
//This is the handle of the system; with this invocation an elliptic curve is created, an admissible bilinear map. Through this handle all the operations of the system can be performed. As parameter is further passed the security parameter, namely the bit length of q, the order of G1.
    BilinearMap map=new ModifiedTatePairing(param);
//A random number generator is initialized SecureRandom randomNumberGenerator=new SecureRandom( );
//P and Q as global parameters are generated.
    Point P=map.newRandomPoint( );
    Point Q=map.newRandomPoint( );
//A secret key K is generated which is used to create the values for the credentials BigInteger K=new BigInteger (randomNumberGenerator);
//A pseudorandom bit permutation PRBP with the secret key K is used to generate the values a and b associated with the two properties property1 and property2
    BigInteger a=PRBP(K, "property 1");
    BigInteger a=PRBP(K, "property2");
//The two credentials credA and credB are generated that have to be transmitted on a secure channel to the first user A and the second user B, respectively, and the matching reference matching reference
    AffinePoint credA=map.multiply(a, P);
    AffinePoint credB=map.multiply(b, P);
    AffinePoint matching_reference=map.multiply(a.add(b), Q);
//User A generates a random nonce n which he keeps secret
    BigInteger n=new BigInteger(randomNumberGenerator);
//And it generates as well the point containing the nonce to send to B AffinePoint nonce=map.getCurve( ).multiply (n, P);
//B generates two random values rB,1 and rB,2 BigInteger rB, 1=new BigInteger(randomNumberGenerator);
    BigInteger $r_{B,2}$=new BigInteger(randomNumberGenerator);

//B uses the information at his disposal (namely P, Q, rB,1, rB,2, nonce, credB) to generate four points P1, P2, P3 and P4 to be sent to A
    AffinePoint    P1=map.multiply(rB,1.multiply(rB,2), nonce);
    AffinePoint P2=map.multiply(rB,1.multiply(rB,2), Q);
    AffinePoint P3=map.multiply(rB,1, credB);
    AffinePoint P4=map.multiply(rB,2, Q);
//A uses the information at his disposal (namely P, Q, n, P1, P2, P3, P4, credA, matching_reference)_to verify the equivalence; the method getPair performs the operations of the bilinear pairing ê, taking as two inputs two points in G1 and returning a number in G2
    map.getPair(P3,P4).multiply(map.getPair(credA, P2)) .power(n).equals(map.getPair(P1, matching reference)));
//This described the direction B→A, with B performing the hiding of the credentials and A performing the matching. The exact same applies in the other direction, with A performing the hiding of the credentials and B performing the matching, only by replacing the code credA by credB.

What is claimed is:

1. A method for performing an untraceable secret matching between at least a first credential associated with a first property of a first user and a second credential associated with a second property of a second user within a network system, wherein the matching performed on a side of the first user comprises:
    receiving using a secure channel the first credential from an authentication component upon verification that the first user possesses the first property;
    receiving using a secure channel a matching reference from a policy manager component upon verification that the first user is entitled to perform the matching, the matching reference being formed such that the first user can detect a matching of the first property with a remote property from a credential of another user during a handshake;
    supplying a first nonce value to the second user;
    receiving a hidden version of the second credential from the second user, the hidden version being formed by the second user on the basis of the second credential, the first nonce value supplied by the first user and at least one random value locally generated on a side of the second user; and
    performing the matching by combining the first credential and the received hidden version of the second credential with the first nonce value and by comparing the combination with the matching reference, wherein:
    the first and the second credentials are formed according to the following formula:

$$\text{Credential}(d) = F(K, d)$$

wherein d is a description of the respective property, F is a pseudorandom bit permutation and K is a random value in a key space of F, and
    the hidden version of the second credential is formed according to the following formula:

$$\{(n_A r_{B,1} r_{B,2})·P, (r_{B,1} r_{B,2})·Q, (r_{B,1} b)·P, r_{B,2}·Q\}$$

wherein $n_A$ is a nonce value supplied by the first user, $r_{b,1}$ and $r_{B,2}$ are two locally generated random values, generated by the second user B and b·P represents the credential of the second user B.

2. The method as in claim 1 further comprising issuing as output true if the matching is verified, false otherwise.

3. The method as in claim 1 wherein receiving using the secure channel the matching reference from the policy manager component comprises receiving a plurality of matching references from the policy manager component, each of the matching references being associated with a property of the first user and formed such that the first user can detect a matching of that respective property with a remote property from a credential of another user during a handshake.

4. The method as in claim 3 wherein the plurality of matching references are stored within a repository.

5. The method claim 1 further comprising:
receiving a second nonce value from the second user;
forming a hidden version of the first credential by forming on the basis of the first credential, the second nonce value supplied by the second user and at least one random value locally generated on the side of the first user; and
supplying the hidden version of the first credential to the second user such that the second user can perform the matching by combining the second credential and the received hidden version of the first credential with the second nonce value and by comparing the combination with an appropriate matching reference.

6. The method as in claim 1 wherein the matching on the side of the first user is performed by verifying the following equation: matching, on the first user's side, is performed using the following equivalence:

$$(\hat{e}((r_{B,1}b) \cdot P, r_{B,2} \cdot Q) \times \hat{e}(a \cdot P, (r_{B,1} r_{B,2}) \cdot Q))^{n_A} \stackrel{?}{=} \hat{e}((n_A r_{B,1} r_{B,2}) \cdot P, (a+b) \cdot Q)$$

wherein $\hat{e}$ is a computable, non-degenerate bilinear map, $r_{B,1}$, $r_{B,2}$ are two random values generated by the second user, b represents the second property, a represents the first property, P, Q are two random generators, $n_A$ is a nonce value locally generated by the first user.

7. A system configured for performing an untraceable secret matching between at least a first credential associated with a first property of a first user and a second credential associated with a second property of a second user within a network system, the system comprising:
one or more processors;
an authentication component configured to use the one or more processors to verify and certify the first property of the first user and the second property of the second user and to grant the first user and the second user with the first credential and the second credential, respectively;
a policy manager component configured to use the one or more processors to verify at least that according to given policy rules the first user is entitled to perform the matching and to issue and transmit an appropriate matching reference to the first user, the matching reference being formed such that the first user can detect a matching of the first property with a remote property from a credential of another user during a handshake; and
the first user configured to supply a first nonce value to the second user, to receive a hidden version of the second credential from the second user, the hidden version being formed by the second user on the basis of the second credential, the first nonce value supplied by the first user and at least one random value locally generated on a side of the second user, and to perform the matching by combining the first credential and the received hidden version of the second credential with the first nonce value and by comparing the combination with the matching reference, wherein:

the first credential and the second credential are to be formed according to the following formula:

$$\text{Credential}(d) = F(K, d),$$

wherein d is a description of the respective property, F is a pseudorandom bit permutation and K is a random value in the key space of F, and the hidden version of the second credential is to be formed according to the following formula:

$$\{(n_A r_{B,1} r_{B,2}) \cdot P, (r_{B,1} r_{B,2}) \cdot Q, (r_{B,1} b) \cdot P, r_{B,2} \cdot Q\}$$

wherein $n_A$ is a nonce value supplied by the user, $r_{B,1}$, and $r_{B,2}$ are two locally generated random values, generated by the second user B and b·P represents the credential of the second user B.

8. The system of claim 7 wherein the first user is further configured to form a hidden version of the first credential, the hidden credential being formed on the basis of the first credential, a second nonce value supplied by the second user and at least one random value locally generated on the side of the first user, and to supply the hidden version of the first credential to the second user.

9. The system of claim 7 further comprising the second user.

10. The system of claim 7 wherein the first user is further configured to issue as output true if the matching is verified, false otherwise.

11. The system of claim 7 wherein the matching is to be performed on the side of the first user by verifying the following equation: matching, on the first user's side, is performed using the following equivalence:

$$(\hat{e}((r_{B,1}b) \cdot P, r_{B,2} \cdot Q) \times \hat{e}(a \cdot P, (r_{B,1} r_{B,2}) \cdot Q))^{n_A} \stackrel{?}{=} \hat{e}((n_A r_{B,1} r_{B,2}) \cdot P, (a+b) \cdot Q)$$

wherein $\hat{e}$ is a computable, non-degenerate bilinear map, $r_{B,1}$, $r_{B,2}$ are two random values generated by the second user, b represents the second property, a represents the first property, P, Q are two random generators, $n_A$ is a nonce value locally generated by the first user.

12. The system of claim 7 wherein the authentication component and the policy manager component are configured to communicate at least with the first user using a secure channel, respectively.

13. A computer program product for performing an untraceable secret matching between at least a first credential associated with a first property of a first user and a second credential associated with a second property of a second user within a network system, the computer program product being tangibly embodied on a non-transitory computer-readable medium and including executable code that, when executed, is configured to cause at least one data processing apparatus to:
receive using a secure channel the first credential from an authentication component upon verification that the first user possesses the first property;
receive using a secure channel a matching reference from a policy manager component upon verification that the first user is entitled to perform the matching, the matching reference being formed such that the first user can detect a matching of the first property with a remote property from a credential of another user during a handshake;
supply a first nonce value to the second user;
receive a hidden version of the second credential from the second user, the hidden version being formed by the second user on the basis of the second credential, the first nonce value supplied by the first user and at least one random value locally generated on a side of the second user; and perform the matching by combining the first credential and the received hidden version of the second credential with the first nonce value and by comparing the combination with the matching reference, wherein:

the first and the second credentials are formed according to the following formula:

Credential($d$)=$F(K, d)$ wherein d is a description of the respective property, F is a pseudorandom bit permutation and K is a random value in a key space of F, and the hidden version of the second credential is formed according to the following formula:

$$\{(n_A r_{B,1} r_{B,2}) \cdot P, (r_{B,1} r_{B,2}) \cdot Q (r_{B,1} b) \cdot P, r_{B,2} \cdot Q\}$$

wherein $n_A$ is a nonce value supplied by the first user, $r_{B,1}$ and $r_{B,2}$ are two locally enerated random values, generated by the second user B and b·P represents the credential of the second user B.

14. The computer program product of claim 13 wherein the executable code is further configured to cause the data processing apparatus to issue as output true if the matching is verified, false otherwise.

15. The computer program product of claim 13 wherein the executable code is further configured to cause the data processing apparatus to:

receive a second nonce value from the second user;

form a hidden version of the first credential by forming on the basis of the first credential, the second nonce value supplied by the second user and at least one random value locally generated on the side of the first user; and supply the hidden version of the first credential to the second user such that the second user can perform the matching by combining the second credential and the received hidden version of the first credential with the second nonce value and by comparing the combination with an appropriate matching reference.

16. A method for performing an untraceable secret matching between at least two credentials of two users, respectively, within a network system, the method comprising:

hiding at least one of the two credentials which is to be sent through the network system from one of the users to the respective other user;

on the basis of the respective credential salted by a nonce and at least one random value, combining on a side of the other user the at least one hidden credential with the other credential of the respective other user; and comparing the combination with an appropriate matching reference, wherein:

the credentials are formed according to the following formula:

Credential($d$)=$F(K,d)$ wherein d is a description of the respective property, F is a pseudorandom bit permutation and K is a random value in a key space of F, and the hidden credential is formed according to the following formula:

$$\{(n_A r_{B,1} r_{B,2}) \cdot P, (r_{B,1} r_{B,2}) \cdot Q (r_{B,1} b) \cdot P, r_{B,2} \cdot Q\}$$

wherein $n_A$ is a nonce value supplied by the one user, $r_{B,1}$ and $r_{B,2}$ are two locally generated random values, generated by the respective other user B and b·P represents the credential of the respective other user B.

* * * * *